Feb. 13, 1934.                L. W. FULLER                1,947,155
                      SCALE LOAD INDICATING PERISCOPE
                         Filed Aug. 6, 1930           2 Sheets-Sheet 1
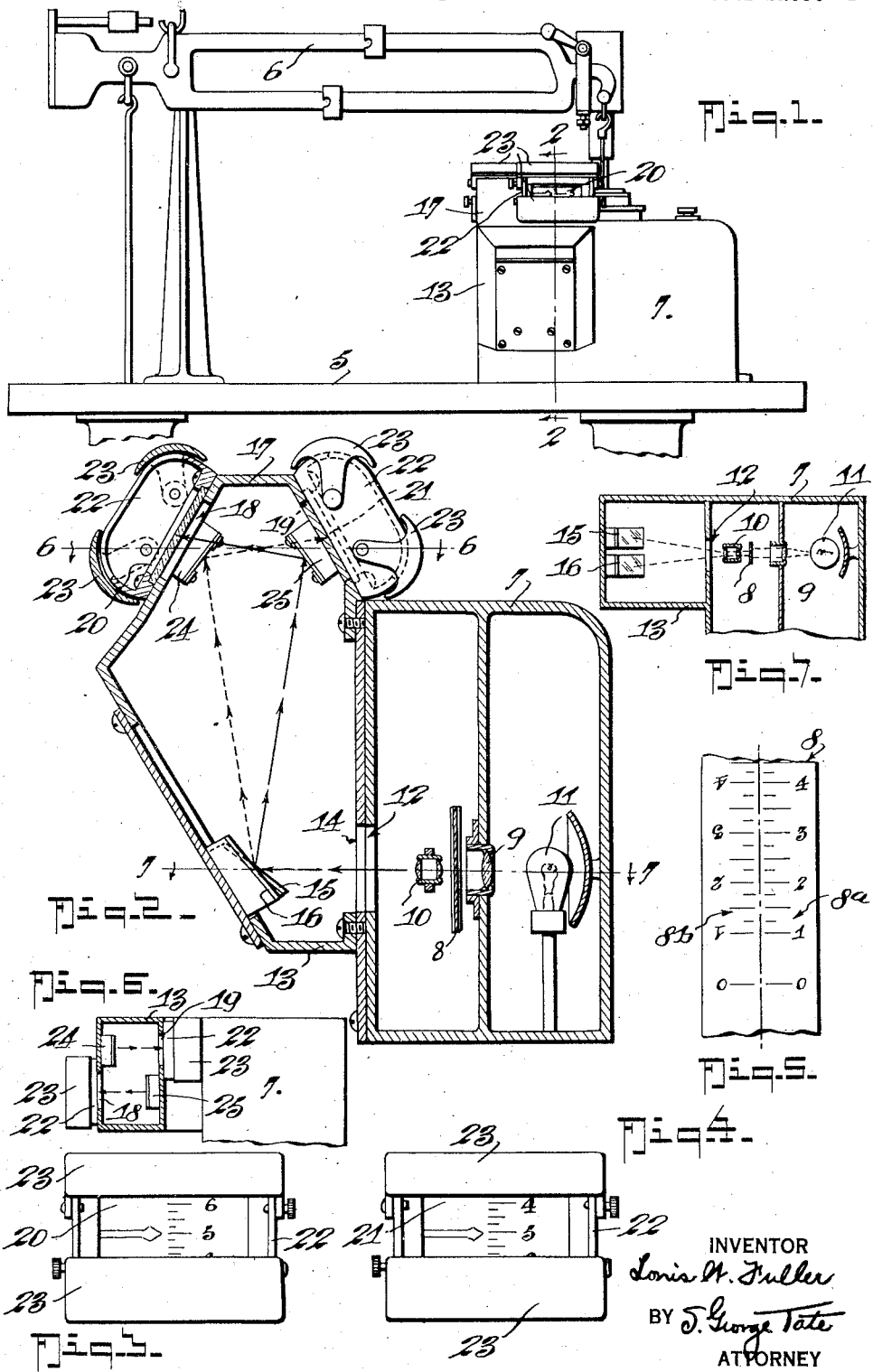
INVENTOR
Louis W. Fuller
BY J. George Tate
ATTORNEY

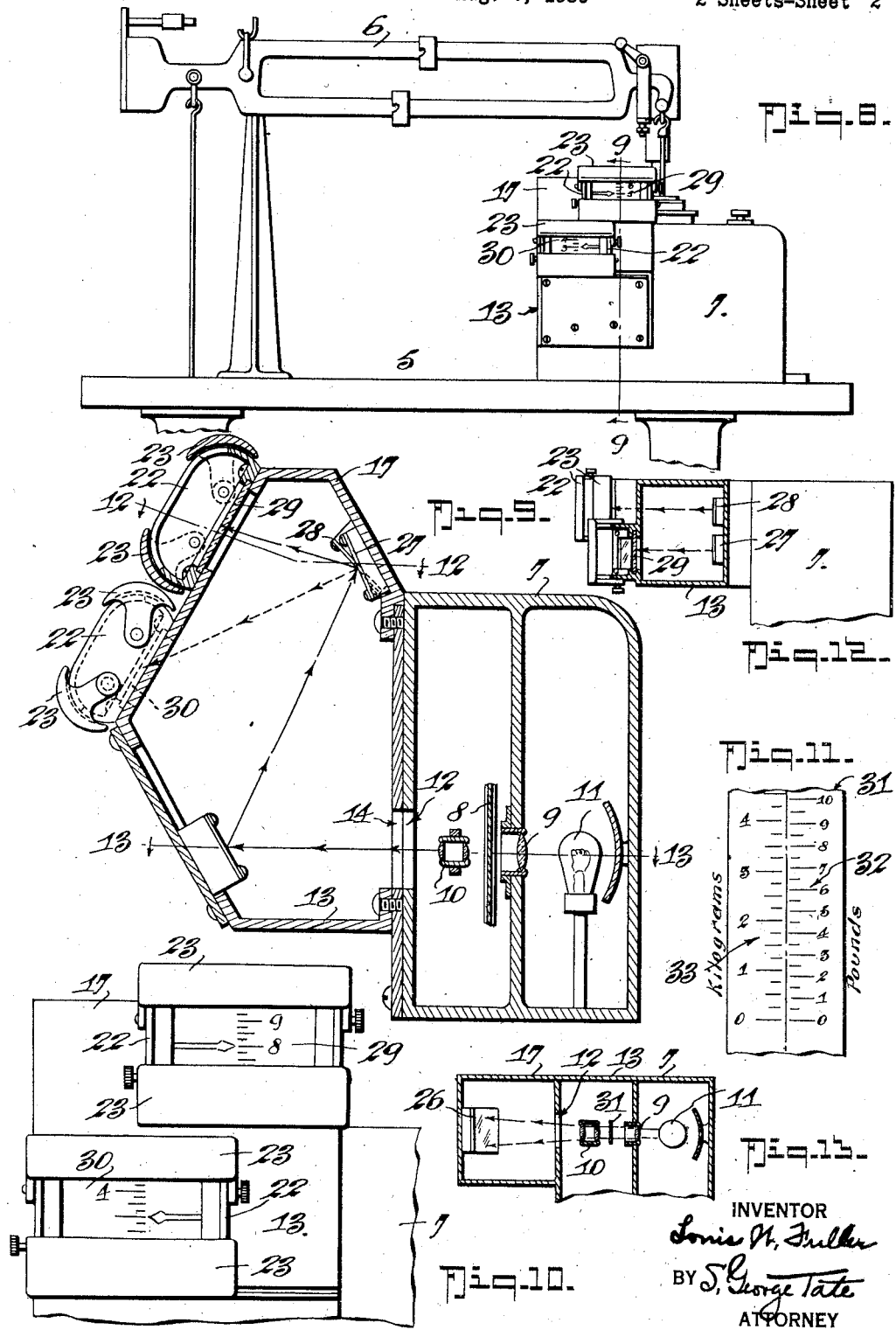

Patented Feb. 13, 1934

1,947,155

UNITED STATES PATENT OFFICE 1,947,155

SCALE LOAD INDICATING PERISCOPE

Louis W. Fuller, Rutland, Vt., assignor to Howe Scale Company, Rutland, Vt., a corporation of Vermont Application August 6, 1930. Serial No. 473,433

4 Claims. (Cl. 88—24)

The invention primarily has for its object to provide a novel periscope structure particularly adaptable to use on scales and like apparatus in which the markings of an indicating scale are projected, preferably in enlarged condition, upon a displaying screen remote from the original of the scale markings, the invention residing broadly in the provision of means for displaying markings of a single original scale at a plurality of places.

In weighing scales and like apparatus it is customary to employ a scale strip which is reciprocated relatively to an index or pointer finger by movement of the scale beam to visibly indicate the scale load. Patent 1,502,443 issued to Henry C. Schaper on July 22, 1924 discloses a scale strip which is transparent and so located relatively to a source of light and a system of lenses and reflectors that the scale markings of respective areas of the strip are projected upon a ground glass display screen, the parts being so constructed and arranged as to provide the desired compactness and yet position the screen at a point sufficiently remote from the strip and light source as to insure the desired enlargement of the scale markings display at the point of view, namely, the screen.

The present invention embraces all of the advantages of the Schaper disclosure which were occasioned by employment of transparent scale strip, lenses, reflectors and remote screen, and further provides for displaying a plurality of sets of scale markings carried by the single scale strip, each set at a different point of view. To this end the invention, in its more detailed nature, resides in the provision of at least two sets of scale markings arranged side by side upon a single transparent scale strip in combination with the source of light and lenses and a dual set of reflector systems so arranged relatively to the parts first mentioned that each set of reflectors will serve to reflect the light rays passing through one side only of the scale strip, there being also provided a separate display screen associated with each reflector system so that each set of scale markings is displayed upon a separate screen. In this manner the screens may be arranged adjacent to one another, one displaying a metric scale and the other an avoirdupois scale, or they may be positioned at opposite sides of the weighing scale and display the same type of scale to enable simultaneous scale readings by persons at opposite sides of the weighing scale.

With these and other objects in view which will more fully appear, the nature of the invention will be more clearly understood by following the description, the appended claims, and the several views illustrated in the accompanying drawings.

In the drawings:—

Figure 1 is a face view illustrating a portion of a beam scale with one form of the invention applied thereon, Figure 2 is a vertical cross section taken on the line 2—2 on Figure 1, Figures 3 and 4 are detail face views illustrating the display at each side of the weighing scale, Figure 5 is a fragmentary face view of the scale strip employed in the form of the invention shown in Figures 1-4, Figures 6 and 7 are somewhat diagrammatic horizontal sections taken respectively on the lines 6—6 and 7—7 on Figure 2 and illustrating the positions of the upper and lower reflectors, Figure 8 is a view similar to Figure 1 and illustrates another form of the invention, Figure 9 is a vertical cross section taken on the line 9—9 on Figure 8, Figure 10 is an enlarged fragmentary face view of the adjacent display screens and illustrates the distinct but related markings displayed thereon, Figure 11 is a fragmentary face view of the scale strip employed in the form of the invention shown in Figures 6-8, and Figures 12 and 13 are somewhat diagrammatic horizontal sections taken on the lines 12—12 and 13—13 on Figure 9 and illustrating the positions of the upper and lower reflectors.

In the drawings 5 designates the table of an ordinary beam scale, 6 the beam or lever thereof, and 7 the main housing of the weight indicating apparatus.

The weight indicating apparatus includes a transparent scale strip 8 bearing two sets of graduations or scale markings $8^a$ and $8^b$ arranged thereon side by side in spaced relation as illustrated in Figure 5 of the drawings. In the illustration of Figure 5 both sets of markings are of the avoirdupois type, one set being arranged reversely of the other so that the ultimate projection at the point of view will be proper, which arrangement will become more evident as the description progresses.

The scale strip 8 is arranged for vertical movement between a condensing lens 9 and projecting lenses 10, there being an electric lamp 11 or other source of light 11 positioned to the rear of the condensing lens 9.

Formed in the front wall of the main housing 7 and in alinement with the axes of the lenses 9 and 10, is an aperture 12. Secured in any suitable manner to the front wall of the housing 7 is a body 13 which is in the nature of an auxiliary or reflector housing and which is equipped with an aperture 14 in register with the aperture of the main housing 7.

A pair of mirrors 15, 16 are mounted in the lower portion of the housing 13, said mirrors being arranged in close relation side by side and at different angles relative to the axis of the lenses 9 and 10 so that they will respectively reflect the light rays passing through the lenses upwardly into the auxiliary housing extension or crown portion 17, one reflector being adapted to reflect the rays directed thereupon toward the rear of said crown portion and the other reflector being adapted to reflect the rays directed thereupon toward the front of said crown portion.

The front and rear walls of the housing crown portion 17 are respectively provided with ground glass screens 20, 21 each of which is protected in a nature from outside light by hood extensions 22, each of which is in turn equipped with upper and lower adjustable hood portions 23 the purpose of which will be obvious. A reflector 24 is mounted adjacent the front wall of the crown extension 17 and a similar reflector 25 is mounted adjacent the rear wall of said crown extension and these reflectors are so positioned relative to the reflectors 15 and 16 that the upper reflector 24 will receive the image directed upon the lower reflector 15 and reflect the same onto the rear housing wall screen 20, while the upper reflector 25 will receive the image projected onto the lower reflector 16 and reflect the same onto the front screen 21.

In the form of the invention disclosed in Figures 1-7, the scale markings 8ª and 8ᵇ of the scale strip 8 will be individually projected upon the front and rear screens 20 and 21 respectively, see Figures 3 and 4. In Figures 6 and 7, I have diagrammatically illustrated the side by side, separated and varied angle relation of the upper and lower reflectors 15, 16 and 24, 25 which bring about this separation and projection of the two sets of scale markings.

In Figures 8 through 13, I have illustrated another form of the invention in which the same principle of projecting a plurality of scale markings from a single scale strip onto a plurality of individually positioned display screens is employed but in which the screens are arranged in adjacent relation at one side of the weighing scale and the scale markings are of different types so that a single observer can make a scale reading of multiple types.

In this form of the invention, I employ a single broad lower reflector 26 capable of projecting both images upwardly toward the rear wall of the housing crown 17. Adjacent the crown rear wall, I mount two upper reflectors 27 and 28 respectively arranged side by side and at different angles so that one thereof will project an area of one set of scale markings onto the screen 29 and the other thereof will project an area of the other set of scale markings onto the screen 30, the screens 29 and 30 being arranged in adjacent but staggered relation as will be evident by reference to Figures 9 and 10 of the drawings.

In this form of the invention the individual sets of scale markings are preferably in two standards as the avoirdupois and metric types as indicated at 32 and 33 in Figure 11. In this manner it is possible to project individual reading of the metric and avoirdupois type upon individual display screens disposed at the same side of the scale and in adjacent relation. It will be observed, however, that the same idea of projecting two types of scale markings might also be employed in the form of the invention first described. It is to be understood that reference herein made to avoirdupois and metric type markings are merely exemplary and are not to be taken as limitations of use of the invention. The invention comprehends the employment of any type of scale markings found to be practical.

It is of course to be understood that the details of structure and arrangements of parts may be variously changed and modified without departing from the spirit and scope of my invention.

I claim:—

1. In a scale, the combination of scale load indicating means including a movable scale strip having thereon a plurality of sets of load indicating markings, individual display screens disposed at the same side of the scale, a reflector set associated with each set of load indicating scale markings, light projecting means associated with said scale strip and common to all sets of markings thereon and including projecting lens equipment by which said sets of markings are respectively projected to said individual reflector sets, said reflector sets including a pair of reflector units arranged side by side at different angles to the projecting axis of said lens equipment whereby said sets of scale markings are individually and simultaneously displayed on the individual display screens individually associated with the respective reflector sets.

2. In scale load indicating means, a single movable transparent scale strip having thereon a plurality of sets of load indicating markings, a single source of light and a single condensing lens unit behind the scale strip, a single projecting lens set in advance of the scale strip, an individual reflector set associated with each set of load indicating markings, said reflector sets cooperating in common with said single light source and lens equipment, and an individual display screen associated with each reflector set to simultaneously display the plurality of sets of load indicating markings individually upon the respective screens.

3. In scale load indicating means, a single movable transparent scale strip having thereon two sets of load indicating markings, a single source of light and a single condensing lens unit behind the scale strip, a single projecting lens set in advance of the scale strip, an individual reflector set associated with each set of load indicating markings, said reflector sets including a pair of reflector units arranged side by side and at different angles for cooperating in common with said single light source and lens equipment, and an individual display screen associated with each reflector set and individually disposed at opposite sides of the scale to simultaneously display the plurality of sets of load indicating markings individually upon the respective screens.

4. In a scale, the combination of scale load indicating means including a movable scale strip having thereon a plurality of sets of load indicating markings one set being of one type of weight indication and the other set of another type of weight indication, individual display screens disposed at the same side of the scale, a reflector set associated with each set of load indicating scale markings, light projecting means associated with said scale strip and common to all sets of markings thereon and including projecting lens equipment by which said sets of markings are respectively projected to said individual reflector sets, said reflector sets including a pair of reflector units arranged side by side at different angles to the projecting axis of said lens equipment whereby said sets of scale markings are individually and simultaneously displayed on the individual display screens individually associated with the respective reflector sets.

LOUIS W. FULLER.